United States Patent
Pereira (10) Patent No.: US 11,157,819 B2
(45) Date of Patent: Oct. 26, 2021

(54) TECHNOLOGY TO AUTOMATICALLY STREAM CONFIDENCE AND PREDICTION INTERVALS FOR NON-PARAMETRIC AND NON-STATIONARY TIME SERIES DATA

(71) Applicant: International Business Machines Corporation, Armonk, NY (US)

(72) Inventor: Victor Pereira, Upper Arlington, OH (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 15/964,946

(22) Filed: Apr. 27, 2018

(65) Prior Publication Data

US 2019/0332949 A1    Oct. 31, 2019

(51) Int. Cl.
*G06N 20/00* (2019.01)
*G06N 5/02* (2006.01)

(52) U.S. Cl.
CPC .............. *G06N 5/022* (2013.01); *G06N 20/00* (2019.01)

(58) Field of Classification Search
CPC ........ G06N 5/022; G06N 20/00; G06N 20/10; G06N 20/20; G06N 5/02; G06N 5/00
See application file for complete search history.

(56) References Cited

U.S. PATENT DOCUMENTS

| | | | |
|---|---|---|---|
| 7,580,852 B2 | 8/2009 | Ouimet et al. | |
| 7,634,423 B2 * | 12/2009 | Brocklebank | G06Q 10/06 705/7.29 |
| 9,336,493 B2 * | 5/2016 | Lee | G06N 20/00 |
| 2005/0234718 A1 * | 10/2005 | Ouimet | G06Q 30/0202 704/241 |
| 2010/0217631 A1 * | 8/2010 | Boss | G06Q 10/06 705/7.22 |
| 2017/0091622 A1 * | 3/2017 | Taylor | G06N 20/00 |
| 2017/0178164 A1 * | 6/2017 | Ghosh | G06Q 30/0204 |

(Continued)

FOREIGN PATENT DOCUMENTS

WO    2014207161 A1    12/2014

OTHER PUBLICATIONS

Three types of forecasts: estimation period, validation period, and "the future", Mar. 19, 2007, https://faculty.fuqua.duke.edu/~rnau/Decision411_2007/three.htm (Year: 2007).*

(Continued)

*Primary Examiner* — Kamran Afshar
*Assistant Examiner* — Shoun J Abraham
(74) *Attorney, Agent, or Firm* — Nolan M. Lawrence (57) ABSTRACT

Methods and systems may provide for technology to generate a plurality of predictions associated with a test period based on an analytics model and generate an error model of the plurality of predictions based on first non-parametric time series data associated with the test period, wherein the error model is to be generated independently of the analytics model. Additionally, the technology may automatically determine an interval based on the error model, the first non-parametric time series data and a margin of error input, wherein the interval is to include an upper bound on a scale associated with the first non-parametric time series data at a time instance in a forecast period and a lower bound on the scale at the time instance.

14 Claims, 5 Drawing Sheets

(56) References Cited

U.S. PATENT DOCUMENTS

2017/0220938 A1* 8/2017 Sainani ............... G06F 16/2428
2017/0351963 A1* 12/2017 Leeds ..................... G01W 1/14
2018/0247215 A1* 8/2018 Garvey ................. G06N 20/00
2018/0285694 A1* 10/2018 Kobayashi ............. G06N 20/20

OTHER PUBLICATIONS

Soares et al., "Ensemble of evolving data clouds and fuzzy models for weather time series prediction", Mar. 2018 https://www.sciencedirect.com/science/article/pii/S1568494617307573 (Year: 2018).*
Byon, "Adaptive learning in time-variant processes with application to wind power systems", IEEE Transactions on Automation Science and Engineering, vol. 13, No. 2, Apr. 2016, pp. 997-1007.
"Real statistics using Excel", real-statistics.com/regression/confidence-and-prediction-intervals/, retrieved on Apr. 12, 2018, 3 pages.
Gama et al., "On evaluating stream learning algorithms", Mach Learn, 2013, pp. 317-346.
Liu et al., "Clinical time series prediction: towards a hierarchical dynamical system framework", Artif Intell Med., Sep. 2015, 36 pages.
Liu et al., "Simultaneous nonparametric inference of time series", The Annals of Statistics, vol. 38, No. 4, 2010, 36 pages.
Romano et al., "Improved nonparametric confidence intervals in time series regressions", Journal of Nonparametric Statistics, Feb. 2006, 24 pages.
Zhao et al., "Confidence bands in nonparametric time series regression", The Annals of Statistics, vol. 36, No. 4, 2008, 26 pages.

* cited by examiner

TECHNOLOGY TO AUTOMATICALLY STREAM CONFIDENCE AND PREDICTION INTERVALS FOR NON-PARAMETRIC AND NON-STATIONARY TIME SERIES DATA

BACKGROUND

Embodiments generally relate to automated time series data analysis. More particularly, embodiments relate to technology that automatically streams confidence and prediction intervals for non-parametric and non-stationary time series data.

Time series data analysis may be used to measure and predict the state of phenomena such as, for example, population levels, energy consumption, etc., over time. Moreover, statistical techniques such as confidence intervals and prediction intervals may provide an estimate of uncertainty in time series data estimations/predictions. For example, a confidence interval is the range that most likely contains the true value of the statistic that is being estimated (e.g., the true population average). A prediction interval is a range that most likely contains the value of a single observation, and may be determined based on the same set of inputs as a confidence interval.

When the time series data does not follow a normal distribution (e.g., non-parametric data) and/or changes significantly over time (e.g., non-stationary data), uncertainty may increase. Indeed, the challenge may be exacerbated when predictions are chained together. Specifically, uncertainty may be compounded and increased when predictions for the most likely outcome at a certain date/time are used as inputs into predictions for the most likely outcome at a later date/time. While techniques may exist to estimate confidence and prediction intervals for non-parametric, non-stationary time series data, there remains considerable room for improvement. For example, conventional solutions may depend on having a deep understanding of the model used to generate the original prediction, involve operations that are difficult and slow to execute, and/or require vast amounts of historical data from stationary (e.g., non-changing) processes.

BRIEF SUMMARY

Embodiments may include a computing device comprising one or more user interface devices to receive a margin of error input, one or more processors, a computer readable storage medium having program instructions embodied therewith, the program instructions executable by the one or more processors to cause the computing device to generate a plurality of predictions associated with a test period based on an analytics model, generate an error model of the plurality of predictions based on first non-parametric time series data associated with the test period, wherein the error model is to be generated independently of the analytics model, and automatically determine an interval based on the error model, the first non-parametric time series data and the margin of error input, wherein the interval is to include an upper bound on a scale associated with the first non-parametric time series data at a time instance in a forecast period and a lower bound on the scale at the time instance, and network interface circuitry to output the interval to a streaming feed.

Embodiments may also include a computer program product to generate interval outputs, the computer program product comprising a computer readable storage medium having program instructions embodied therewith, the program instructions executable by a computing device to cause the computing device to generate a plurality of predictions associated with a test period based on an analytics model, generate an error model of the plurality of predictions based on first non-parametric time series data associated with the test period, wherein the error model is to be generated independently of the analytics model, and automatically determine an interval based on the error model, the first non-parametric time series data and a margin of error input, wherein the interval is to include an upper bound on a scale associated with the first non-parametric time series data at a time instance in a forecast period and a lower bound on the scale at the time instance.

Embodiments may also include a method comprising generating a plurality of predictions associated with a test period based on an analytics model, generating an error model of the plurality of predictions based on first non-parametric time series data associated with the test period, wherein the error model generated independently of the analytics model, and automatically determining an interval based on the error model, the first non-parametric time series data and a margin of error input, wherein the input includes an upper bound on a scale associated with the first non-parametric time series data at a time instance in a forecast period and a lower bound on the scale at the time instance.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Streaming confidence intervals and/or prediction intervals may be advantageous in a wide variety of settings. Confidence intervals typically give the range of uncertainty on averages and may be determined based on 1) the best estimate of the statistic (e.g., the average of several observations), 2) the volume of historical data used to compute the estimate, 3) how different one observation is from the other (e.g., sample variability), and 4) how certain the end user would like to be that the computed range includes the true and unknown value of the statistic (e.g., wider confidence intervals for higher certainty vs. lower confidence intervals for lower certainty). Prediction intervals typically give the range of uncertainty on specific observations and may be determined based on the same set of inputs as confidence intervals.

Figure 1:
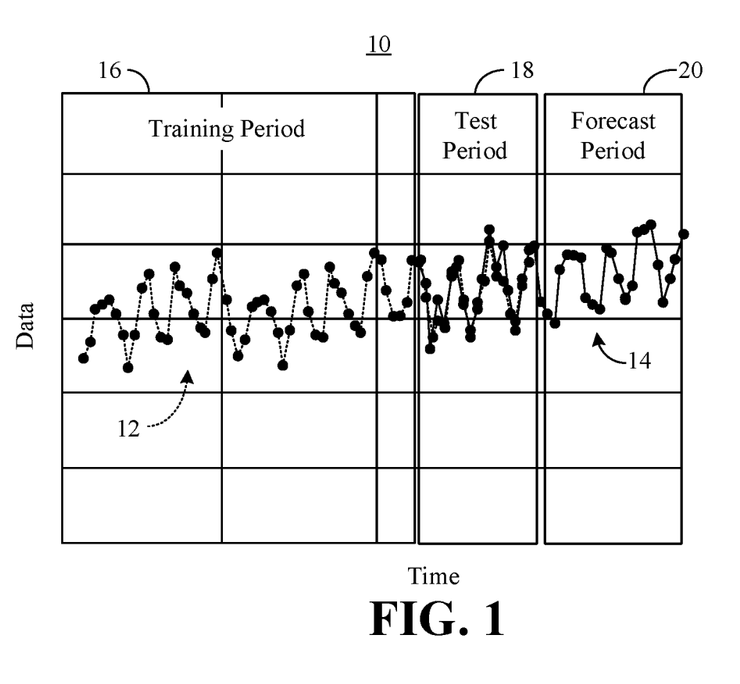
FIG. 1 is a plot of an example of time series data and a corresponding set of predictions partitioned into a training period, a test period and a forecast period according to an embodiment.

Turning now to FIG. 1, a plot 10 of time series data 12 and a plurality of predictions 14 is shown. In the illustrated example, the time series data 12 is collected during a training period 16 and a test period 18, where the predictions 14 may be generated for the test period 18 and a forecast period 20. The illustrated time series data 12 may be considered non-parametric to the extent that it does not follow a normal distribution (e.g., Bell curve). Such a situation might occur when the time series data 12 measures a human-impacted phenomenon such as, for example, energy consumption (e.g., renewable, non-renewable), water consumption (e.g., flow rates), population, traffic flow, etc. Moreover, the time series data 12 may be considered non-stationary to the extent that it changes (e.g., increases or decreases) significantly over time. In the illustrated example, the time series data 12 increases over time in a manner that may increase uncertainty.

The illustrated training period 16 ends at the beginning of the test period 18. In a streaming (e.g., real-time) application, the forecast period 20 may begin at a current time instance, the test period 18 may end at the current time instance, and the forecast period 20 and the test period 18 may be of equal size (e.g., two weeks). In one example, an analytics model (e.g., neural network) is trained on the time series data 12 collected during the training period 16, where the time series data 12 collected during the test period 18 is input to the analytics model in order to obtain the predictions 14. As will be discussed in greater detail, an error model of the predictions 14 may be generated based on the time series data 12 collected during the test period 18 and the predictions 14 made for the test period 18. Additionally, the error model may be used to generate the predictions 14 in the forecast period 20. Confidence intervals and/or prediction intervals may be automatically generated based on the error model, the time series data 12 collected during the test period 18 and a margin of error input (e.g., 95% certainty request).

Of particular note is that the error model may be generated independently of (e.g., agnostic to) the underlying analytics model. Such a solution may be advantageous if the analytics model is complex. For example, in the case of a neural network being used as the analytics model, a number of equations in the form, $$\frac{2}{(1 - e^{(-2*(ax+b))})} - 1 \quad (1)$$

where x is a vector, may be weighted, averaged and used as exponents of other equations of the same or different form. The resulting equations may also be averaged and used as exponents of other equations, etc. Back propagation and iteration may also be used. By constructing an error model that is generated independently of the analytics model, complex operations such as the use of gradients, first and second order series approximations (e.g., Taylor series approximations), complex linear algebra (e.g., to derive an error function based on the last historical value and the elapsed time thereafter), and so forth, may be eliminated. Accordingly, this reduction of error modeling complexity may in turn enable the confidence intervals and/or prediction intervals around the predictions 14 in the forecast period 20 to be made more quickly and in real-time (e.g., streamed), even when the time series data 12 is non-parametric.

Moreover, configuring the test period 18 and the forecast period 20 to be of equal size may limit the amount of time series data 12 involved in generating the predictions 14. For example, if energy consumption is being predicted 1, 2, 3, . . . , 20 time instances into the future, the illustrated solution works with data for twenty time instances in the past (e.g., rather than 20 X time instances as in an experimental approach; and where X is the number of observations needed for a reasonable approximation of each prediction—typically X=30). Additionally, configuring the test period 18 and the forecast period 20 to be of equal size may limit the uncertainty resulting from the non-stationary nature of the time series data 12. More particularly, older data 12 from the training period 16 may not be as relevant to the predictions associated with the forecast period 20 as newer data 12 from the test period 18.

Figure 2:
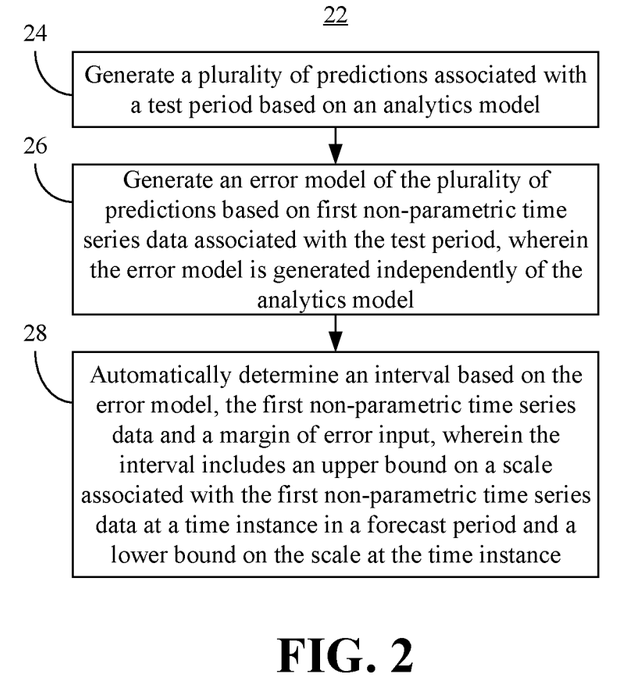
FIG. 2 is a flowchart of an example of a method of operating a data analytics computing device according to an embodiment.

FIG. 2 shows a method 22 of operating a data analytics computing device, which may be centralized, distributed or any combination thereof. The method 22 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In general, the granularity and time horizon of the analysis may be determined. For example, if predicting energy consumption in a region over the next week in one-hour time windows, then the granularity would be one hour and the time horizon, k, would be 7×24=168 time windows. For simplicity, the last known historical value (i.e., the present) may be designated as time zero. Historical time series data such as, for example, the time series data 12 (FIG. 1), may be partitioned/split into two periods/blocks: a training period that ends at time—k−1 (in the above example, −169) and a test period that spans from time −k to time 0 (in the above example, −168 to time 0). The training period may be used to train an analytics model (or ensemble/stacking of models) to predict future occurrences.

Illustrated processing block 24 provides for generating a plurality of predictions associated with the test period based on the trained analytics model. Block 26 generates an error model of the plurality of predictions based on first non-parametric time series data associated with the test period, wherein the error model is generated independently of the analytics model. As already noted, configuring the error model to be generated independently of the underlying analytics model may eliminate any need to have a deep understanding of the model used to generate the original predictions and may result in operations that are easy and fast to execute. Moreover, an interval (e.g., confidence interval, prediction interval) may be automatically determined at block 28 based on the error model, the first non-parametric time series data and a margin of error input. As already noted, the confidence interval may be the range that most likely contains the true value of the statistic that is being estimated (e.g., the true population average) and the prediction interval may be the range that most likely contains the value of a subsequent observation (e.g., the true population).

In the illustrated example, the interval includes an upper bound on a scale (e.g., energy consumption scale, water consumption scale, population scale, traffic flow scale) associated with the first non-parametric time series data at a time instance in a forecast period and a lower bound on the scale at the time instance. Block 28 may be repeated for each time instance in the forecast period. Block 28 may also include outputting the interval to a streaming feed, wherein the method 22 is repeated every time new data is collected. In one example, the method 22 is implemented as a stand-along library that is applied whenever a prediction on time series data is made.

Figure 3:
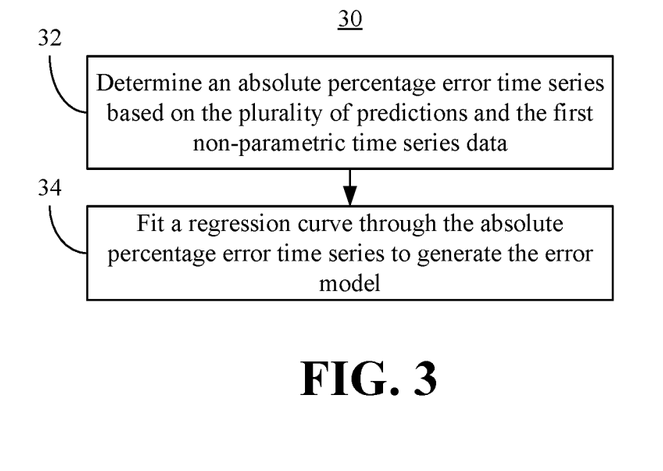
FIG. 3 is a flowchart of an example of a method of generating an error model according to an embodiment.

FIG. 3 shows a method 30 of generating an error model. The method 30, which may generally be implemented in fixed-functionality hardware, configurable logic, logic instructions, etc., or any combination thereof, may be readily substituted for block 26 (FIG. 2), already discussed. Illustrated processing block 32 provides for determining an absolute percentage error time series based on the plurality of predictions and the first non-parametric time series data, wherein a regression curve may be fit through the absolution percentage error time series to generate the error model at block 34. More particularly, the absolute percentage error may be computed from each prediction in the test period 18 as, $$e(t) = \frac{|y(t) - y'(t)|}{y'(t)}, \forall t = -k, \ldots, 0. \quad (2)$$

where e(t) is the observed error at time t, y(t) is the observed value at time t (in the above example, the energy consumption at time t), y'(t) is the predicted value at time t, and k is the time horizon.

Figure 4:
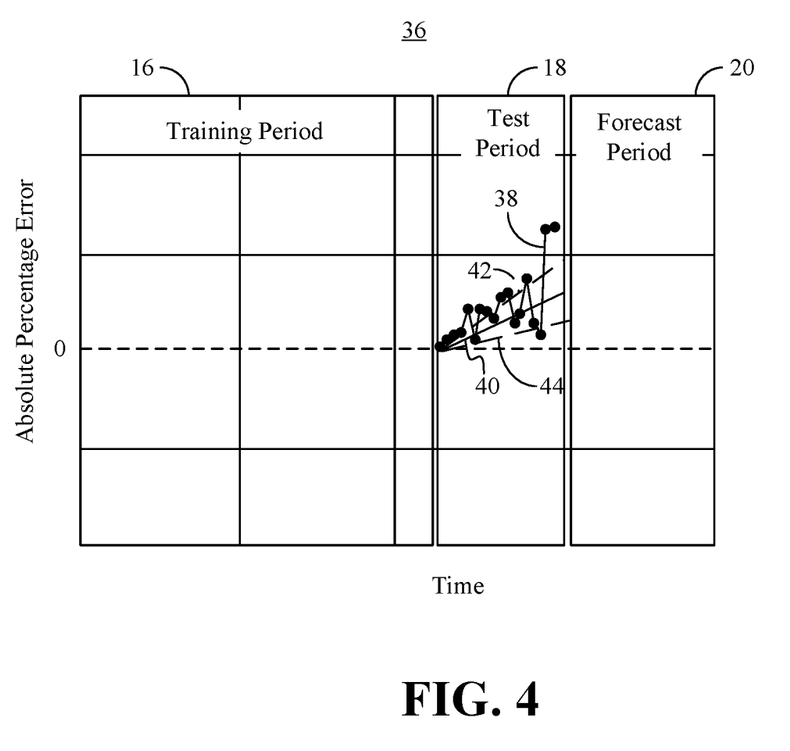
FIG. 4 is a plot of an example of a regression curve according to an embodiment.

FIG. 4 shows a plot 36 of an absolute error time series 38. Once the absolute error time series 38 has been generated, the time horizon may be rewritten so that the test period begins at time 0 instead of time −k. That is, let the new time horizon v=t+k, so that $$e(v) = \frac{|y(v) - y\prime(v)|}{y\prime(v)}, \forall v = 0, \ldots, k. \quad (3)$$

A slope-only linear regression 40 may be fit through the absolute error time series 38 via an ordinary least squares procedure. Non-linear regressions may also be used, but potentially with reduced tractability (e.g., ease of implementation). The intercept parameter may be ignored because at time 0, the actual value is known and there is no error. Assuming that linear regression is used, the interval may be determined based on the slope of the line. More particularly, the resulting equation may be given by $$e'(v)=b'\times v, \forall v=0, \ldots, k \quad (4)$$

Where e' (v) is the estimated error at time v and b' is the estimated slope of the regression line. More complex models may be used, but potentially with reduced tractability. As will be discussed in greater detail, an upper limit 42 and a lower limit 44 may define an uncertainty boundary (e.g., margin of error) for the linear regression 40.

Figure 5:
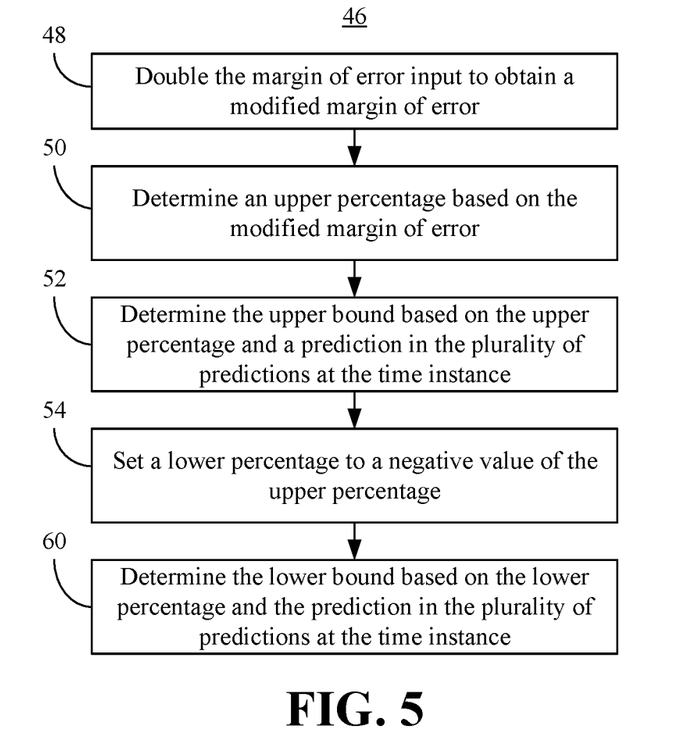
FIG. 5 is a flowchart of an example of a method of automatically determining an interval according to an embodiment.
Figure 6:
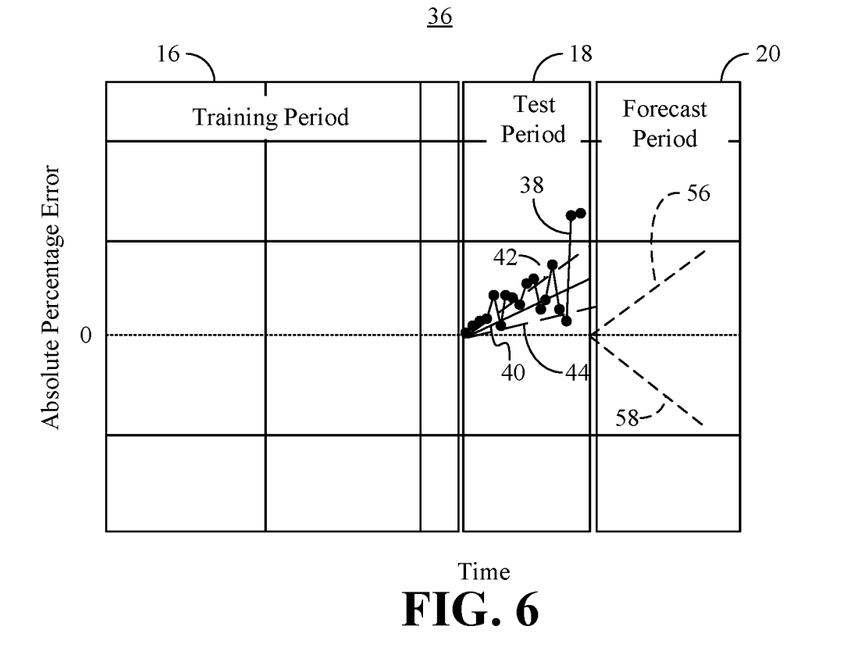
FIG. 6 is a plot of an example of an upper percentage determination and a lower percentage determination according to an embodiment.

With continuing reference to FIGS. 5 and 6, a method 46 of automatically determining an interval is shown. The method 46, which may generally be implemented in fixed-functionality hardware, configurable logic, logic instructions, etc., or any combination thereof, may be readily substituted for block 28 (FIG. 2), already discussed. Illustrated processing block 48 provides for doubling a margin of error input (e.g., 5%) to obtain a modified margin of error. Thus, if the margin of error input is 5%, the modified margin of input would be 10%. An upper percentage 56 may be determined at block 50 based on the modified margin of error. Block 50 might use the expression $(1-2\times moi_{mod})$ to determine the upper limit 42 on a confidence interval around the linear regression 40, where $moi_{mod}$ is the modified margin of error. Thus, for a 10% modified margin of error, the upper limit 42 on the confidence interval around the linear regression 40 would be 90%. Standard statistical techniques may be used to determine the upper percentage 56 that corresponds to the upper limit 42 on the confidence interval around the linear regression 40. For example, through the expressions:

$$UCI_{v,1-2\times moi_{mod}} = e'(v) + t^*_{k-2,1-2\times moi_{mod}} s_e \sqrt{\frac{1}{k} + \frac{(v-\bar{v})^2}{s_v^2}} \quad (5)$$

and $$s_e = \sqrt{\frac{1}{k-2} \sum_{x=1}^{k} (e(x) - e'(x))^2} \quad (6)$$

and $$s_v^2 = \sum_{x=1}^{k} (x - \bar{v})^2 \quad (7)$$

and $$\bar{v} = \frac{1}{k} \sum_{x=1}^{k} x = \frac{k+1}{2} \Rightarrow s_v^2 = \frac{k(k^2-1)}{12} \quad (8)$$

or, more succinctly, $$UCI_{v,1-2\times moi_{mod}} = e'(v) + t^*_{k-2,1-2\times moi_{mod}} s_e \sqrt{\frac{1}{k}\left[1 + \frac{3(2v-k-1)^2}{k^2-1}\right]} \quad (9)$$

Were $UCI_{v,1-2\times moi_{mod}}$ is the upper limit 42 on the one minus the modified margin of error confidence interval around the linear regression 40 at time v, $t_{k-2,1-2\times moi_{mod}}$* is the $1-2\times moi_{mod}$ critical value for the Student t distribution with k−2 degrees of freedom, $s_e$ is the residual standard error, and $s_v^2$ is the sum of squared differences between the times in the testing horizon. As mentioned before, e' (v) is the predicted error at time v, e(v) is the actual error at time v, and k is the number of time periods in the testing period such that v ranges from 1 through k.

A similar approach may be used to compute $UPI_{v,1-2\times moi_{mod}}$, the upper limit 42 on the one minus the modified margin of error prediction interval around the linear regression 40 at time v:

$$UCI_{v,1-2\times moi_{mod}} = \quad (10)$$
$$e'(v) + t^*_{k-2,1-2\times moi_{mod}} s_e \sqrt{1 + \frac{1}{k}\left[1 + \frac{3(2v-k-1)^2}{k^2-1}\right]}$$

For example, if the estimated absolute error at time 10, e'(10), is 1% if the $UCI_{10,0.9}$ half-width is 2%, then $UCI_{10,0.9}$ may be 3%. In such a case, block 50 would determine that the upper percentage 56 is 3%.

Illustrated block 52 determines an upper bound based on the upper percentage 56 (e.g., 3%) and a prediction in the plurality of predictions at the time instance (e.g., 10). Thus, if the average energy consumption at time instance 10 is predicted to be 100 MW, block 52 might calculate the upper bound to be 100 MW×(1+3%)=103 MW. Block 54 may set a lower percentage 58 to a negative value of the upper percentage 56. In the above example, the lower percentage 58 would be set to −3%. The operation in block 48 of doubling the margin of error input enables the negation operation of block 54 to generate a range in which the margin of error input (e.g., 5%) is evenly split between samples above the upper percentage 56 and below the lower percentage 58. Block 60 may determine the lower bound based on the lower percentage 58 and the prediction in the plurality of predictions at the time instance. Thus, in the above example, block 60 would calculate the lower bound to be 100 MW×(1−3%)=97 MW.

Figure 7:
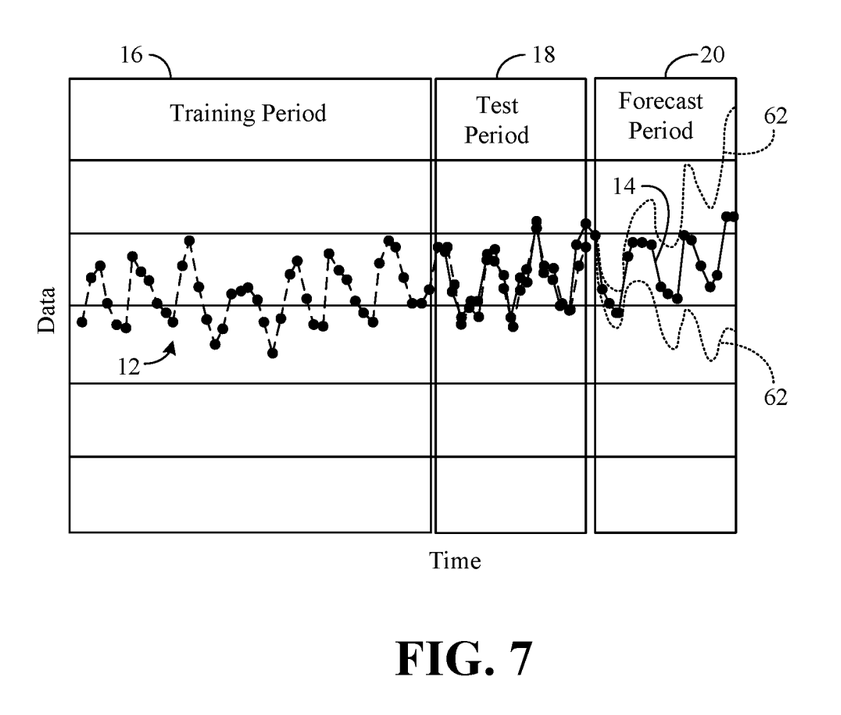
FIG. 7 is a plot of an example of an upper bound determination and a lower bound determination according to an embodiment.

FIG. 7 demonstrates that an interval 62 may therefore be output to a streaming feed. In the above example, the interval 62 at time instance 10 would be the range of 97 MW to 103 MW. As already noted, the method 46 (FIG. 5) may be repeated for each time instance in the forecast period 20.

Figure 8:
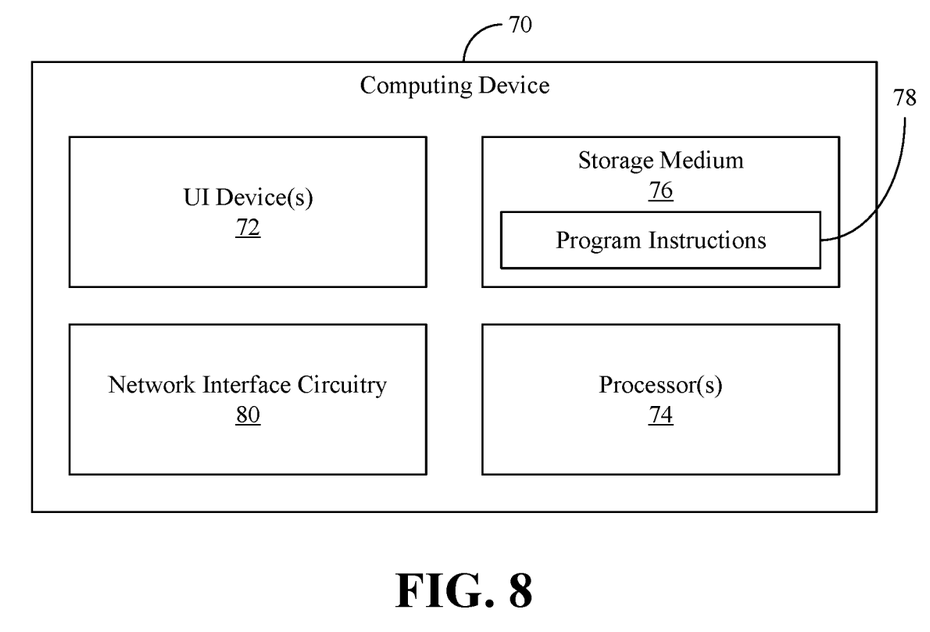
FIG. 8 is a block diagram of an example of a data analytics computing device according to an embodiment.

FIG. 8 shows a computing device 70 that may be used to automatically stream confidence and/or prediction intervals for non-parametric and non-stationary time series data. The illustrated computing device 70, which may be centralized (e.g., client device, server) or distributed (e.g., data center, cloud computing infrastructure), includes one or more user interface (UI) devices 72 (e.g., keyboard, mouse, touch pad, touch screen, monitor, microphone, speaker) to receive a margin of error input. The margin of error input may generally define an acceptable amount of uncertainty (e.g., 5%). One or more processors 74 may be coupled to the UI device(s) 72 and a storage medium 76 (e.g., non-volatile memory, volatile memory, etc., or any combination thereof). In the illustrated example, the storage medium 76 includes program instructions 78 embodied therewith. The program instructions 78 may be executable by the processors 74 to cause the computing device 70 to perform one or more aspects of the method 22 (FIG. 2), the method 30 (FIG. 3) and/or the method 46 (FIG. 5), already discussed. In one example, the program instructions 78 are implemented as a stand-alone library that is applied whenever a prediction on time series data is made.

Thus, execution of the program instructions 78 by the processor(s) 74 may cause the computing device 70 to generate a plurality of predictions associated with a test period based on an analytics model and generate an error model of the plurality of predictions based on first non-parametric time series data associated with the test period, wherein the error model is to be independent (e.g., agnostic to) the analytics model. Additionally, execution of the program instructions 78 may cause the computing device 70 to automatically determine an interval based on the error model, the first parametric time series data and the margin of error input, wherein the interval is to include an upper bound on a scale associated with the first non-parametric time series data at a time instance in a forecast period and a lower bound on the scale at the time instance. Execution of the program instructions 78 may also cause the computing device 70 to repeat the interval determination for each time instance in the forecast period. Moreover, the computing device 70 may include network interface circuitry 80 (e.g., wired, wireless) to output the intervals to a streaming feed.

The intervals may also be output via one or more of the UI device(s) 72 (e.g., visually presented on a display, audibly output via one or more speakers, etc.). The intervals may be confidence intervals, prediction intervals, etc., or any combination thereof. Additionally, the scale may be an energy consumption scale, a water consumption scale, a population scale, a traffic flow scale, etc., or any other scale associated with non-parametric time series data.

Accordingly, the illustrated program instructions 78 improve the operation of the computing device 70 by enabling the real-time generation and streaming of statistical intervals. More particularly, the independence of the error model from the analytics model may significantly simplify the interval determination. Indeed, the slope of a linear regression curve may be easily and quickly translated into the upper and lower bounds of the interval as described herein. Moreover, the equal size of the test period and the forecast period may significantly reduce the amount of data involved in determining the interval, which may in turn enhance efficiency, decrease processing overhead and/or reduce power consumption in the computing device 70.

Figure 9:
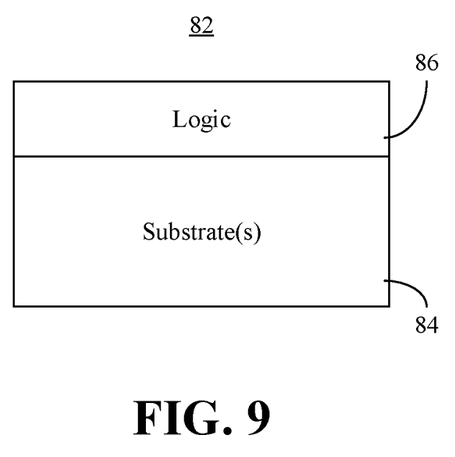
FIG. 9 is an illustration of an example of a semiconductor apparatus according to an embodiment.

Turning now to FIG. 9, a semiconductor apparatus 82 (e.g., chip, die) that includes one or more substrates 84 (e.g., silicon, sapphire, gallium arsenide) and logic 86 (e.g., transistor array and other integrated circuit/IC components) coupled to the substrate(s) 84. The logic 86, which may be implemented at least partly in configurable logic and/or fixed-functionality hardware logic, may generally implement one or more aspects of the method 22 (FIG. 2), the method 30 (FIG. 3) and/or the method 46 (FIG. 5), already discussed.

Thus, the logic 86 may generate a plurality of predictions associated with a test period based on an analytics model and generate an error model of the plurality of predictions based on first non-parametric time series data associated with the test period, wherein the error model is to be independent (e.g., agnostic to) the analytics model. Additionally, the logic 86 may automatically determine an interval based on the error model, the first parametric time series data and the margin of error input, wherein the interval is to include an upper bound on a scale associated with the first non-parametric time series data at a time instance in a forecast period and a lower bound on the scale at the time instance. The logic 86 may also repeat the interval determination for each time instance in the forecast period. Moreover, the logic 86 may output the intervals to a streaming feed.

The intervals may also be output via one or more of UI device(s) (e.g., visually presented on a display, audibly output via one or more speakers, etc., not shown). The intervals may be confidence intervals, prediction intervals, etc., or any combination thereof. Additionally, the scale may be an energy consumption scale, a water consumption scale, a population scale, a traffic flow scale, etc., or any other scale associated with non-parametric time series data.

Accordingly, the illustrated logic 86 improves the operation of the semiconductor apparatus 82 by enabling the real-time generation and streaming of statistical intervals. More particularly, the independence of the error model from the analytics model may significantly simplify the interval determination. Indeed, the slope of a linear regression curve may be easily and quickly translated into the upper and lower bounds of the interval as described herein. Moreover, the equal size of the test period and the forecast period may significantly reduce the amount of data involved in determining the interval, which may in turn enhance efficiency, decrease processing overhead and/or reduce power consumption in the semiconductor apparatus 82.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computing device comprising:
one or more user interface devices to receive a margin of error input; one or more processors;
a computer readable storage medium having program instructions embodied therewith, the program instructions executable by the one or more processors to cause the computing device to:
generate a plurality of predictions associated with a test period based on an analytics model,
generate an error model of the plurality of predictions based on first non-parametric time series data associated with the test period, wherein the error model is to be generated independently of the analytics model,
double the margin of error input to obtain a modified margin of error,
determine an upper percentage based on the modified margin of error,
determine an upper bound based on the upper percentage and a prediction in the plurality of predictions at a time instance,
set a lower percentage to a negative value of the upper percentage,
determine a lower bound based on the lower percentage and the prediction in the plurality of predictions at the time instance, and
determine an interval based on the error model, the first non-parametric time series data and the margin of error input, wherein the interval is to include the upper bound on a scale associated with the first non-parametric time series data at a time instance in a forecast period and the lower bound on the scale at the time instance,
wherein the forecast period is to begin at a current time instance, the test period is to end at the current time instance and the forecast period and the test period are to be of equal size,
wherein the determination reduces processing overhead by eliminating one or more complex analytics model operations; and
network interface circuitry to output the interval to a streaming feed.

2. The computing device of claim 1, wherein the program instructions are further executable to cause the computing device to:
determine an absolute percentage error time series based on the plurality of predictions and the first non-parametric time series data, and
fit a regression curve through the absolute percentage error time series to generate the error model.

3. The computing device of claim 2, wherein the regression curve is a line and the interval is to be determined based on a slope of the line.

4. The computing device of claim 1, wherein the interval is selected from a group consisting of a confidence interval and a prediction interval, and wherein the scale is selected from a second group consisting of an energy consumption scale, a water consumption scale, a population scale and a traffic flow scale.

5. The computing device of claim 1, wherein the program instructions are further executable to cause the computing device to train the analytics model based on second non-parametric time series data associated with a training period that ends at a beginning of the test period.

6. A computer program product to generate interval outputs, the computer program product comprising a computer readable storage medium having program instructions embodied therewith, the program instructions executable by a computing device to cause the computing device to:
generate a plurality of predictions associated with a test period based on an analytics model;
generate an error model of the plurality of predictions based on first non-parametric time series data associated with the test period, wherein the error model is to be generated independently of the analytics model;
double a margin of error input to obtain a modified margin of error;
determine an upper percentage based on the modified margin of error;
determine an upper bound based on the upper percentage and a prediction in the plurality of predictions at a time instance;
set a lower percentage to a negative value of the upper percentage;
determine a lower bound based on the lower percentage and the prediction in the plurality of predictions at the time instance; and
determine an interval based on the error model, the first non-parametric time series data and a margin of error input, wherein the interval is to include the upper bound on a scale associated with the first non-parametric time series data at a time instance in a forecast period and the lower bound on the scale at the time instance,
wherein the forecast period is to begin at a current time instance, the test period is to end at the current time instance and the forecast period and the test period are to be of equal size,
wherein the determination reduces processing overhead by eliminating one or more complex analytics model operations.

7. The computer program product of claim 6, wherein the program instructions are further executable to cause the computing device to:
  determine an absolute percentage error time series based on the plurality of predictions and the first non-parametric time series data; and
  fit a regression curve through the absolute percentage error time series to generate the error model.

8. The computer program product of claim 7, wherein the regression curve is a line and the interval is to be determined based on a slope of the line.

9. The computer program product of claim 6, wherein the interval is selected from a group consisting of a confidence interval and a prediction interval, and wherein the scale is selected from a second group consisting of an energy consumption scale, a water consumption scale, a population scale and a traffic flow scale.

10. The computer program product of claim 6, wherein the program instructions are further executable to cause the computing device to train the analytics model based on second non-parametric time series data associated with a training period that ends at a beginning of the test period.

11. A method comprising:
  generating a plurality of predictions associated with a test period based on an analytics model;
  generating an error model of the plurality of predictions based on first non-parametric time series data associated with the test period, wherein the error model is generated independently of the analytics model;
  doubling a margin of error input to obtain a modified margin of error;
  determining an upper percentage based on the modified margin of error;
  determining an upper bound based on the upper percentage and a prediction in the plurality of predictions at a time instance;
  setting a lower percentage to a negative value of the upper percentage;
  determining a lower bound based on the lower percentage and the prediction in the plurality of predictions at the time instance; and
  determining an interval based on the error model, the first non-parametric time series data and a margin of error input, wherein the interval includes the upper bound on a scale associated with the first non-parametric time series data at a time instance in a forecast period and the lower bound on the scale at the time instance,
  wherein the forecast period begins at a current time instance, the test period ends at the current time instance and the forecast period and the test period are of equal size,
  wherein the determination reduces processing overhead by eliminating one or more complex analytics model operations.

12. The method of claim 11, wherein generating the error model includes:
  determining an absolute percentage error time series based on the plurality of predictions and the first non-parametric time series data; and
  fitting a regression curve through the absolute percentage time series.

13. The method of claim 12, wherein the regression curve is a line and the interval is determined based on a slope of the line.

14. The method of claim 11, wherein the interval is selected from a group consisting of a confidence interval and a prediction interval, and wherein the scale is selected from a second group consisting of an energy consumption scale, a water consumption scale, a population scale and a traffic flow scale.

* * * * *